United States Patent [19]

Büdel

[11] Patent Number: 5,711,392
[45] Date of Patent: Jan. 27, 1998

[54] PROTECTIVE DEVICE FOR A MOTOR VEHICLE TO PREVENT UNAUTHORIZED USE

[75] Inventor: Ulrich Büdel, Leinfelden-Echterdingen, Germany

[73] Assignee: Mercedes-Benz AG, Germany

[21] Appl. No.: 546,134

[22] Filed: Oct. 20, 1995

[30] Foreign Application Priority Data

Nov. 17, 1994 [DE] Germany ............... 44 40 975.3

[51] Int. Cl.$^6$ ................................ B60R 25/00
[52] U.S. Cl. ............... 180/287; 307/10.2; 340/426
[58] Field of Search ................. 180/287, 271; 307/10.2–10.4; 340/426, 539, 428, 480

[56] References Cited

U.S. PATENT DOCUMENTS

| | | | |
|---|---|---|---|
| 3,703,714 | 11/1972 | Andrews | 180/287 |
| 4,159,467 | 6/1979 | Ballin | 360/64 |
| 5,370,201 | 12/1994 | Inubushi | 180/287 |
| 5,449,957 | 9/1995 | Carlo | 307/10.3 |
| 5,563,453 | 10/1996 | Nyfelt | 307/10.2 |
| 5,604,384 | 2/1997 | Carlo et al. | 180/287 X |

FOREIGN PATENT DOCUMENTS

| | | |
|---|---|---|
| 0 417 944 | 3/1991 | European Pat. Off. . |
| 0 574 230 | 12/1993 | European Pat. Off. . |
| 42 39 271 | 10/1993 | Germany . |
| 42 40 458 | 12/1993 | Germany . |

OTHER PUBLICATIONS

"Satellitenhilfe gengen Auto-Lau (Satellite Protection Against Auto Theft)", R. Gramm, Funkschau, Feb. 1993, pp. 42–45.

Primary Examiner—Christopher P. Ellis
Attorney, Agent, or Firm—Evenson, McKeown, Edwards & Lenahan, P.L.L.C.

[57] ABSTRACT

The invention provides a device for protection against unauthorized use of a motor vehicle, in which usage authorization information is transmitted electromagnetically, at preset time intervals, by a transmitter in a predetermined vehicle usage area. A usage control device aboard a vehicle keeps an operational critical vehicle assembly or assemblies that are operationally essential in operational readiness after a usage signal is received for only a predetermined subsequent period of time, and blocks further operation if further usage signals are not received within the predetermined time period.

4 Claims, 1 Drawing Sheet

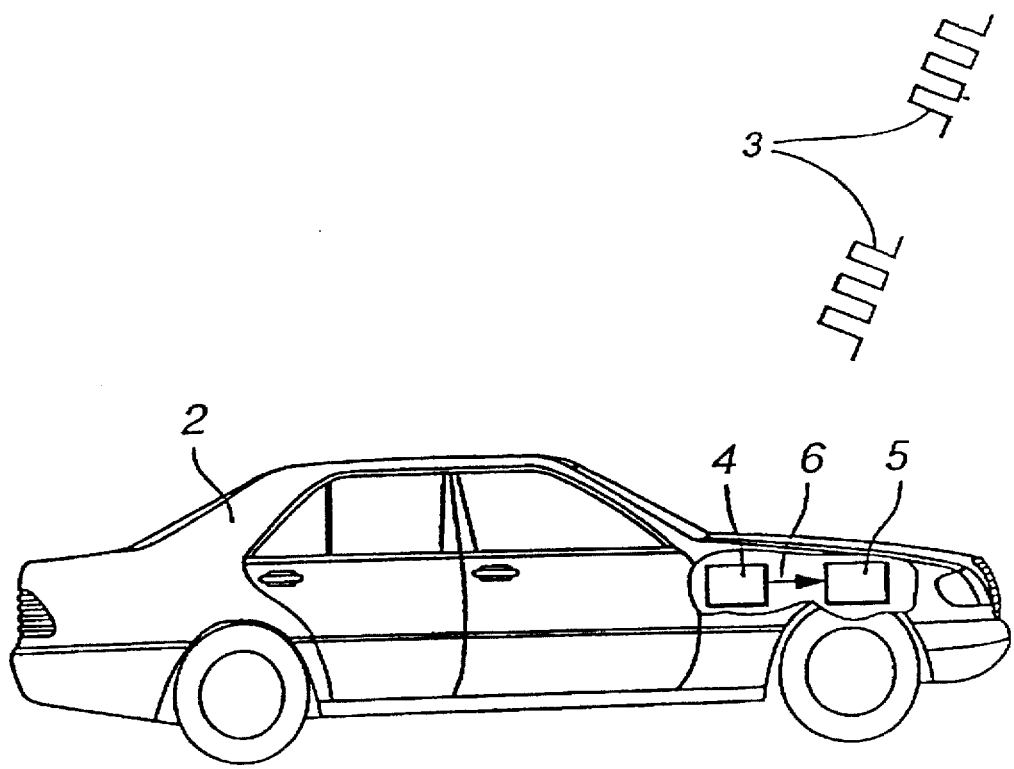

PROTECTIVE DEVICE FOR A MOTOR VEHICLE TO PREVENT UNAUTHORIZED USE

BACKGROUND AND SUMMARY OF THE INVENTION

The invention relates to a protective device to prevent unauthorized use of a motor vehicle, in which a usage control device mounted on the vehicle controls the operating state of at least one assembly essential for vehicle operation, as a function of usage authorization information that is supplied and is specific to the vehicle.

A device of this kind is disclosed for example in U.S. Pat. 4,805,722, in which the usage control device controls, among other things, the ignition and gasoline supply to a motor vehicle with an internal combustion engine. Control is based on usage authorization information, including at least vehicle identity information as well as usage duration information that can be supplied to the input by a card reader and a card which is insertable therein. When a vehicle is started, the usage control device compares this information with vehicle identity information stored therein and with the time information generated by its own timer regarding the current date and time. If it determines from this comparison that the vehicles are not identical or that the usage duration stored on the card has expired, it blocks further operation of the vehicle by interrupting the supply of gasoline and deactivating the ignition.

With a system of this kind based on a user card, both in the case of access-blocking systems in the form of locking systems with mechanical and/or electrical keys, there is the risk that an unauthorized user may, by threatening the authorized user, come into the possession of the usage-authorizing element, (i.e., the card or the key), as well as the user code information required for further use.

In order to combat the danger of the driver's being threatened in this manner, it has been proposed to activate a drive-away lock (that is, a disabling device) located in the vehicle, only after a theft has occurred by means of a radio signal that can be triggered by the manufacturer for example, so that following the initially successful attempt at theft, the unauthorized person would have no reason to threaten the authorized person. However, this protection against unauthorized use remains ineffective if the unauthorized person successfully manages to take measures in the meantime to shield the receiver in the vehicle that is designed to receive the radio signal for the drive-away lock.

It is also known that indirect protection against unauthorized use can be provided by equipping the vehicle with a satellite positioning system (e.g., a so-called GPS system), to enable it to be located at any time in this fashion. See, for example, the article "Satellitenhilfe gegen Auto-Klau [Satellite Protection Against Auto Theft]" by R. Gramm in the periodical Funkschau, 16/1993, page 42. Use of such a position-finding system however involves considerable expense, and is also problematic from the data protection standpoint.

German Patent Document DE 42 40 458 C1 teaches another device of the species recited at the outset in which a code transmitter integrated into the ignition key of the motor vehicle periodically transmits signals when the ignition is switched on. The signals are received and evaluated by a code receiver integrated in an electronic device in the motor vehicle. If the code signal is missing or defective, an alarm sounds. Provision can be made for the code receiver to be connected with the vehicle's electrical system, and to block functionally critical elements of the motor vehicle in the event of an alarm. It is also proposed to equip when necessary a plurality of electronic devices located in a vehicle, each with its own code receiver, and to design it so that functionally critical assemblies of the electronic device are shut off if no code signal is received by the code receiver.

German Patent Document DE-OS 42 39 271 A1 teaches a theft protection device using a transmit/receive principle in which an object to be monitored, especially a vehicle, contains a receiver with an individual address. When its address is received, as transmitted by a transmitter located outside the object (for example, a radio transmitter), a transmitter located in the object is activated, which then sends out signals that can be received and evaluated by at least one additional receiver located outside the object. The receivers located outside the object, in the case of monitoring a motor vehicle, are distributed across the countryside at highway on-ramps, gasoline stations, entrances to communities, etc. The signal sent out by the transmitter in the object is evaluated by the receivers located outside the object wherever this transmitter and the object to be monitored are located, in order to be able to locate the object at any time.

One object of the present invention is to provide a protective device to prevent unauthorized use, which offers considerable protection against theft, is easy to use and functionally reliable, does not endanger the authorized vehicle user, and cannot be disabled by screening measures to keep out signals transmitted to the vehicle.

This problem is solved by a protective device according to the present invention, in which usage signals are transmitted periodically and sequentially from a location outside the vehicle over an electromagnetic transmission link. By virtue of the usage control device, one or more vehicle assemblies essential to the operation of the vehicle are kept operationally ready following receipt of a usage signal, for only a predetermined period of time that is longer than the time interval between two sequential usage signals. Further use of such assemblies (and hence use of the motor vehicle itself) is prevented if further usage signals are not received during this predetermined period of time. Instead of transmitting use-preventing radio signals, as in the case of the known radio-signal-activated drive-away lock, in this case usage-authorization signals are received in their place. In this way, the device is automatically protected from shielding measures directed against signals transmitted to the vehicle by an unauthorized person, since it is in the interests of the respective vehicle user that the signal be received with as little interference as possible.

When a theft occurs, the authorized person reports it to the location authorized to transmit the usage signals, which then stops sending the usage signals, so that the usage control device then blocks further vehicle operation, either immediately after a usage signal fails to appear or after a further time interval has elapsed. (The latter possibly is advantageous for functional safety and/or availability considerations.) Such an authorized location for example can be a government office such as the police or it can be the vehicle manufacturer.

Since the usage authorization information is transmitted outside the vehicle by one or more transmitters by means of electromagnetic waves, without additional expense and by a suitable choice of the transmission range that can be covered, the area of use for the respective vehicle can be predetermined in desired fashion, and can be limited in particular to a certain area such as Germany or Europe.

Since the authorized individual has no direct influence on the transmission of usage signals, this eliminates the risk of threat to him from an unauthorized person. This danger of threats to the vehicle user is also minimized by the fact that the vehicle can be reported stolen and then shut down by the authorized location, i.e., by a person other than the user himself. The device can also provide protection against fraudulently initiated theft by the authorized person himself, with the insurance company directing the authorized location to send no further usage signals for this vehicle when the authorized person reports his vehicle to them as stolen. The vehicle that has been reported stolen can then no longer be used, and therefore can no longer be sold illegally by the current user for further active use.

In one embodiment of the invention, the usage signals are transmitted over a digital radio network so that the device does not require a separate transmission link. In another embodiment, a car phone forms the receiving part of the usage control device, in addition to its usual function at the same time. This eliminates the need for a separate receiver in vehicles already equipped with a car phone.

Other objects, advantages and novel features of the present invention will become apparent from the following detailed description of the invention when considered in conjunction with the accompanying drawings.

BRIEF DESCRIPTION OF THE DRAWINGS

The single FIGURE shows a schematic block diagram of a device to protect against unauthorized use, with usage signal transmission.

DETAILED DESCRIPTION OF THE DRAWINGS

The FIGURE shows schematically a transmitter (1) which transmits, for registered vehicles (2) (of which only one is shown) vehicle-specific usage authorization information over a digital radio network (3) in a predetermined vehicle usage area. Although only a single transmitter (1) is shown it is to be understood that a plurality of such transmitters are situated throughout the authorized use area, as described previously. The transmitted usage authorization information contains usage signals in the form of a signal pulse group of vehicle-specific information, with the usage signals being transmitted periodically and sequentially at predetermined time intervals. Alternatively, the transmitter (1) can be a satellite transmitter as well as a ground transmitter.

Aboard the vehicle, the protective device to prevent unauthorized use incorporates a usage control device (4) and a plurality of vehicle assemblies that are essential for vehicle operation, of which one (5) is shown as an example. The vehicle assembly (5) can be, for example, any of the various control devices that are present in the electrical system of vehicle (2), such as an existing engine control device. Each of these operationally necessary vehicle assemblies (5) incorporated in the protective device to prevent unauthorized use can have its operating state switched between authorized operation and blocked operation by usage control device (4) by employing an associated manipulation-proof control line (6), in a manner that is known, per se. In vehicles that have a control device data bus, signal line (6) can preferably be made part of this bus system. If an externally connected control line (6) is omitted, usage control device (4) can be integrated separately into each of the incorporated vehicle assemblies (5) in order to even further increase protection against manipulation. Such details of the implementation of a central or decentral drive-away blockage function of this kind for vehicle assemblies aboard the vehicle are known, and therefore require no detailed description here. In particular, when this functional part of the drive-away lock integral with the vehicle is actuated, it is important to be sure that it cannot be bypassed by a simple replacement of individual parts or vehicle components.

Usage control device (4) may comprise a receiver contained in a vehicle car phone as the unit incorporated in the usage control device (4). Of course a separate receiver can be provided for vehicles without car phones. Whenever a new usage signal is received, the usage control device (4) then compares the vehicle identity information of the received usage signal with vehicle identity information stored. If the usage signal is recognized as belonging to the vehicle, the usage control device (4) enables operationally essential vehicle assemblies (5) for a predetermined period of time during active operation, with this preset duration being longer than the time between two successively transmitted usage signals. Depending on the desired transmission reliability, this assembly operating time can be a multiple of the transmitted usage signal time interval. If no further usage signals are received within this authorized assembly operation time, the usage control device (4) will keep the vehicle assemblies (5) in question operationally ready for a predetermined time interval (so that no safety-critical driving states or availability problems result). After this time interval has elapsed, the vehicle assemblies (5) in question will be caused to enter their operation-blocking state whenever the vehicle (2) next stops (for example, the next time the ignition is shut off), so that the vehicle cannot be placed in operational readiness.

Such omission of the usage signals that maintain vehicle operation can be initiated by the location authorized to transmit the usage authorization information (for example, the police), or by the authorized person or his insurance company after the vehicle is reported stolen. In addition, the absence of usage signals may be due to the fact that the vehicle has moved out of the usage area defined by the range of transmitter (1). By determining desired usage areas the theft and illegal sale of vehicles in other countries and/or continents can be effectively suppressed as a result. On the instrument panel, a suitable warning indication such as a pilot light or alphanumeric display can be provided to inform the vehicle owner that the usage signals are absent and to give him an opportunity to go to a garage within a specified time interval. There it can be determined whether there is a problem with the operation of the protective device to prevent unauthorized use. If necessary provision can be made for providing emergency operation, for example once after the drive-away lock function is triggered or for a predetermined period of time thereafter.

The transmission of usage signals over the radio network (3) is highly resistant to manipulation because neither the authorized person nor (and particularly) an unauthorized person will be able to detect from the plurality of transmitted usage signals for the various vehicles, the one intended for that particular vehicle, in order to generate it in some other way and thus defeat the system. If desired, a code-protected usage signal transmission can also be set up such as is conventionally employed for transmitting usage code in access authorization systems with electronic key codes. Such code protected systems are well known, and therefore need requiring description in greater detail here.

The above description of a preferred embodiment clarifies the above-mentioned advantages of the protective device to prevent unauthorized use. Of course, the device is suitable both for a vehicle fleet with a limited number of vehicles, for example a forwarding company, an automobile rental company, or a taxi company, and basically for all vehicles in an affected area. In the latter case, for example, after a vehicle is registered, a requirement to transmit the usage signals provided for the vehicle can be given by the registry to the office authorized to transmit signals. The transmission of the individual usage signal will then be terminated by the authorized location when required to do so by an authorized person, for example by the authorized vehicle user, his insurance company, or by the registry after the vehicle is reported stolen. In addition the device can be used for a fleet of rental vehicles, with the usage signal transmission being limited in advance to the respective rental period, thus preventing unauthorized use of rented vehicles beyond the rental period.

The device according to the invention therefore constitutes a highly reliable manipulation-resistant and easy-to-use system for protecting vehicles against unauthorized use. Direct theft is not prevented, but rather is rendered unattractive by virtue of the fact that the vehicle can be immobilized at any time from a central location. The cost of possible additional access controls, lock systems, or conventional drive-away locks can thus be eliminated or in any case reduced.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Device to protect against unauthorized use of a motor vehicle having a usage control device mounted on the vehicle which enables or prevents the operation of at least one operationally critical vehicle assembly as a function of transmitted usage information, said device comprising:

at least one transmitter situated at a fixed location outside said vehicle for transmitting usage authorization information periodically and sequentially at preset time intervals by means of an electromagnetic transmission link having a transmission range which covers a predetermined authorized use area for said vehicle, said usage authorization information including vehicle-specific usage authorization signals; and a usage control device for receiving said usage authorization signals and, in response to each receipt of a usage authorization signal, enabling operation of said at least one operationally critical vehicle assembly for a predetermined time period following such receipt, and blocking operation of said at least one operationally critical vehicle assembly when said usage control device fails to receive a further usage authorization signal within said predetermined time period.

2. Device according to claim 1 wherein the usage authorization information is transmitted over a digital radio transmission link.

3. Device according to claim 2 wherein the usage control device comprises a car phone to receive the usage authorization information.

4. Method of protecting against unauthorized use of a motor vehicle having a usage control device mounted on the vehicle which enables or prevents the operation of at least one operationally critical vehicle assembly as a function of transmitted usage information, such method comprising the steps of:

periodically, at preset time intervals, transmitting vehicle usage authorization information from fixed locations throughout an authorized vehicle use area, from at least one transmitter located outside said vehicle, said usage authorization information including vehicle specific information which is unique to said vehicle;

receiving said vehicle usage authorization information on said vehicle; and in response to each receipt of vehicle usage information containing said vehicle specific information, enabling operation of said at least one operationally critical vehicle assembly for a predetermined time period following such receipt with said at least one operationally critical vehicle assembly being disabled after expiration of said predetermined time period, absent receipt during said predetermined time period of further vehicle usage information containing said vehicle specific information;

wherein said predetermined time period is greater than said preset time intervals.

* * * * *